G. H. LANG.
PRINTING MACHINE.
APPLICATION FILED SEPT. 20, 1910.

1,103,063.

Patented July 14, 1914.
6 SHEETS—SHEET 1.

G. H. LANG.
PRINTING MACHINE.
APPLICATION FILED SEPT. 20, 1910.

1,103,063.

Patented July 14, 1914.
6 SHEETS—SHEET 2.

Witnesses.
Thomas J. Drummond.
Joseph M. Ward.

Inventor.
George H. Lang,
by Lemly & Guery Attys.

G. H. LANG.
PRINTING MACHINE.
APPLICATION FILED SEPT. 20, 1910.

1,103,063.

Patented July 14, 1914.
6 SHEETS—SHEET 3.

Witnesses.
Thomas J. Drummond
Joseph M. Ward.

Inventor.
George H. Lang,
by Lemley Huguy
Attys.

Fig. 12.

Opened by　　Counted by　　Bundled by

P.B. LAUNDRY.
BOSTON.

Route No.　　Week ending ..................191

Laundry (　　) Mark.

| | B |
|---|---|
| 2 Shirts............................................15 | 30 |
| Collars.................................2⅛ | |
| Cuffs...................................2⅛ | |
| 6 Hose..................................3 | 18 |
| Ladies Dresses...............50 to 3.50 | |
| White Skirts..........................20 | |
| 3 White Waists........................30 up | 12 |
| 4 Towels................................3 | |
| Sheets.................................5 | |
| Pillow Slips............................3 | |
| Napkins................................2 | |

G. H. LANG.
PRINTING MACHINE.
APPLICATION FILED SEPT. 20, 1910.

1,103,063.

Patented July 14, 1914.
6 SHEETS—SHEET 6.

Witnesses:
Thomas J. Drummond
Joseph M. Ward

Inventor
George H. Lang,
by Crosby Gregory attys.

UNITED STATES PATENT OFFICE.

GEORGE H. LANG, OF BOSTON, MASSACHUSETTS.

PRINTING-MACHINE.

1,103,063.　　　　　Specification of Letters Patent.　　Patented July 14, 1914.

Application filed September 20, 1910. Serial No. 582,836.

*To all whom it may concern:*

Be it known that I, GEORGE H. LANG, a citizen of the United States, residing at Boston, county of Suffolk, and State of Massachusetts, have invented an Improvement in Printing-Machines, of which the following description, in connection with the accompanying drawing, is a specification, like characters on the drawing representing like parts.

This invention relates to printing machines of that type which embody a printing head having a plurality of independently settable printing members bearing different characters and means for setting the type members to bring any desired character or characters into printing position. Printing machines of this type are more or less commonly used for printing or impressing identifying marks on such articles as laundry, parts of shoes, cartons, clothing, etc., and as illustrating such a machine which is designed for marking laundry I would refer to my former Patent No. 864,790.

The object of my present invention is to provide a printing machine of the above-mentioned type which is arranged to print different data concerning a quantity of goods, which different data have a fixed relation to each other. As an example, I would refer to such different kinds of data as the quantity and price, or the quantity and weight of a given lot of merchandise or articles. The machine herein shown and in which I have chosen to illustrate my invention is adapted to print the quantity or number of a certain lot of articles and the price of the entire lot, although it will be obvious that by changing the printing characters on the printing members any other desired information regarding the articles could be printed. A machine adapted to thus print both the quantity and the price of any given articles is useful for a great variety of purposes, and merely as illustrating one concrete example, I would refer to its use in printing laundry lists. It is the common practice in laundries to use printed laundry lists on which are imprinted the names of the various articles that can be cleansed at the laundry, together with a price list for the various articles. When any bundle of clothes is received at the laundry, a clerk usually looks the bundle over and marks on a laundry list the number or quantity of each of the different kinds of articles in the bundle, and at an appropriate time during the laundrying process the data on the laundry list is completed by marking in a suitable space opposite each article the cost or charge for laundrying the number or quantity of such articles as indicated by the laundry list. For instance, if in any one bundle there should be two shirts, six hose, three white waists, and four towels, the clerk who received the laundry would mark at the appropriate places on the laundry list the quantity of each of these articles and before the laundry was returned to the owner, the total price for such quantity of each article would be placed in the appropriate column on the list so that the list would contain not only the number of articles in the bundle, but also the total charges for laundrying such articles.

The machine herein illustrated is especially adapted for marking laundry lists as above described, and it is so arranged that the printing members can be so set to print simultaneously on the laundry list the quantity of each of the articles contained in any bundle of laundry and also the charge for laundrying each quantity of articles. I would state, however, that by properly changing the nature of the printing characters on the printing members, the device could be used for marking other lists than laundry lists and also for printing any desired information.

The drawings illustrate the invention as it would be embodied in a machine adapted to mark laundry lists.

Figure 12:
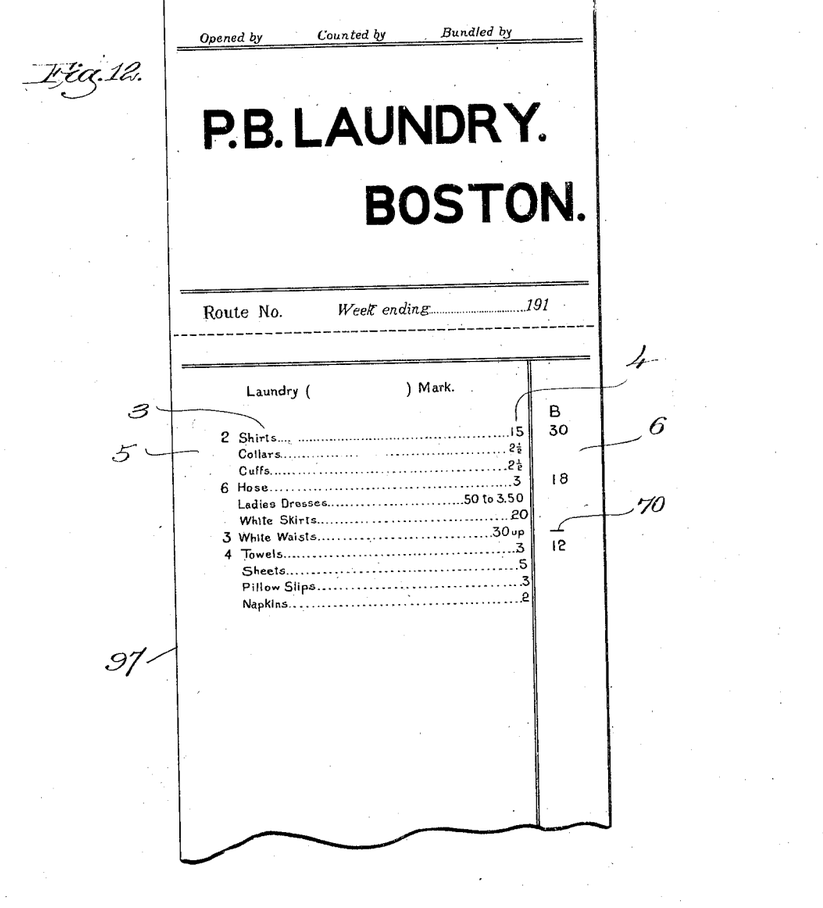
Fig. 12 shows a portion of a laundry list which has been printed on the machine herein illustrated.

Before proceeding to describe the machine, I will refer to Fig. 12 which illustrates a laundry list such as is commonly used in laundries. This laundry list comprises a slip of paper on which is printed the names of the various articles that are apt to be included in the washing of a person or family, a few of such articles being printed at 3 on the list shown in the drawings. Opposite each article in the column 4 is printed the price for laundrying each article. At the left-hand edge of the list a blank space 5 is usually left in which some employee at the laundry writes the number or quantity of each of the articles comprising any particular washing, and at the opposite side is a column 6 in which is written the total price for the quantity of each article. This laundry list with the price thus written thereon is usually kept with the washing and is delivered to the owner when the washing is returned. If, for instance, any particular washing contained two shirts, six hose, three white waists and four towels, the laundry list would be marked as shown in Fig. 12 of the drawing to indicate the correct number of each of these articles and then before the laundry was sent home the numbers 30, 18, 12, etc., would be filled into the space 6 to indicate the charges for laundrying the quantity of shirts, hose, towels, etc., indicated on the list. So far as I am aware, the columns 5 and 6 of these laundry lists are at present always filled in by hand, but the machine herein shown is designed to do away with this hand work and to accurately print both the number of the articles and the price for laundrying them.

My improved machine comprises a printing head having provision for marking not only the quantity of each article, but also the price of the quantity, a platen on which the laundry list is supported, and means to give the head and platen a relative movement to bring the printing members of the printing head into printing contact with the list. This relative movement may be secured either by making the printing head capable of movement toward and from the platen, or by making the platen capable of movement toward and from the printing head. In the present embodiment I have mounted the platen so that it will move toward and from the printing head and I prefer this construction because the printing head with all the necessary printing members thereon to print an extended laundry list would be rather heavy and more or less difficult to manipulate quickly.

Figure 1:
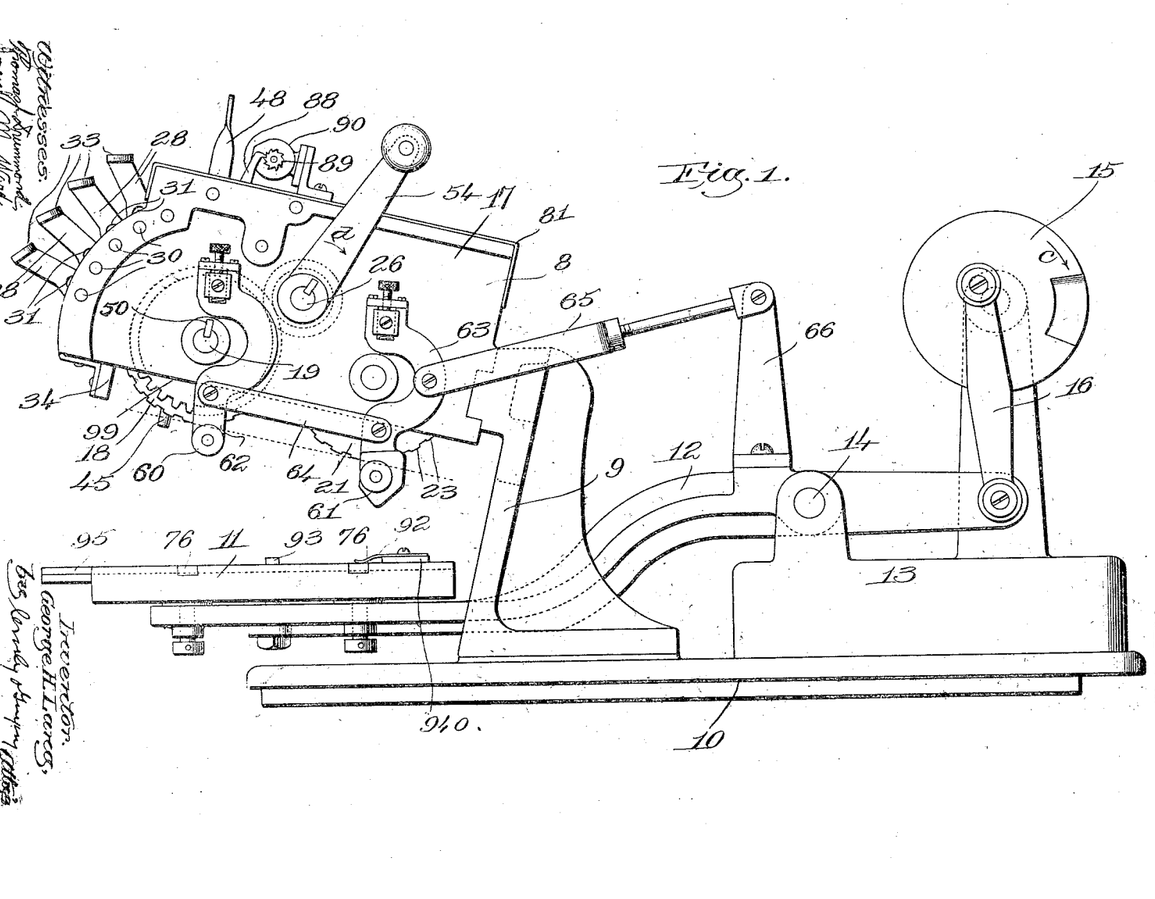
Figure 1, is a side view of such a machine.

The printing head is shown generally at 8 and is mounted on a bracket or stand 9 that rises from the base 10 of the machine, the latter being constructed so that the machine can be placed on and secured to an ordinary table or bench. The platen is shown at 11 and it is mounted so that it can be moved toward and from the printing head. I have herein shown it as mounted on an arm 12 which is pivoted at 14 to a support 13 and is actuated by some suitable mechanism as by means of a crank disk 15 that is connected thereto by means of a link 16. The crank disk may be driven in any suitable or usual way. This construction is such that the revolution of the crank disk will move the platen up and down from the full line position shown in Fig. 1 to the dotted line position.

The printing head is made with two side pieces 17 between which the printing members are situated. These printing members are preferably in the form of type wheels which have the desired characters formed on the surface thereof. The printing members comprise a plurality of type wheels 18 that are adapted to print characters indicating quantity, and which will be hereinafter referred to as "quantity-indicating wheels", and another set of type wheels 21 that are adapted to print characters indicating price or cost and which will be hereinafter referred to as "price-indicating wheels". The quantity-indicating wheels 18 are mounted to turn freely on a rod 19 that extends between the two side pieces 17 and have on their periphery characters 20 which are adapted to indicate quantity. While these characters 20 may be any suitable characters adapted to indicate quantity, I will preferably use ordinary numerals, the number of which will depend on the size of the type wheels. The price-indicating wheels 21 are loosely mounted on a rod 22 extending from one side piece 17 to another and have on their periphery characters 23 indicating cost, charges or prices. I will preferably have one price-indicating wheel for each quantity-indicating wheel, and each price-indicating wheel will have as many characters 23 thereon as there are characters 20 on the corresponding quantity-indicating wheel, and each character 23 will be such as to indicate the charge or price for the quantity indicated by the corresponding printing character on the corresponding quantity-indicating wheel.

Figure 2:
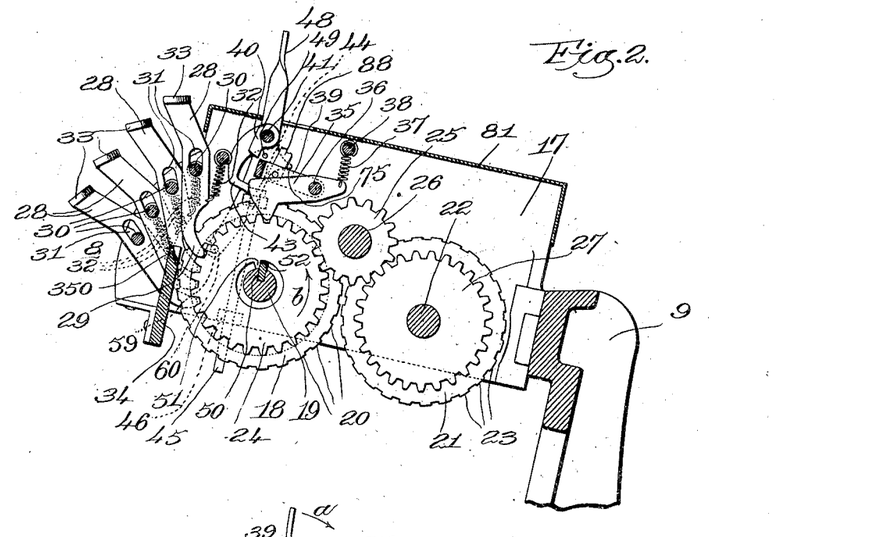
Fig. 2 is a section view through the printing head.
Figure 5:
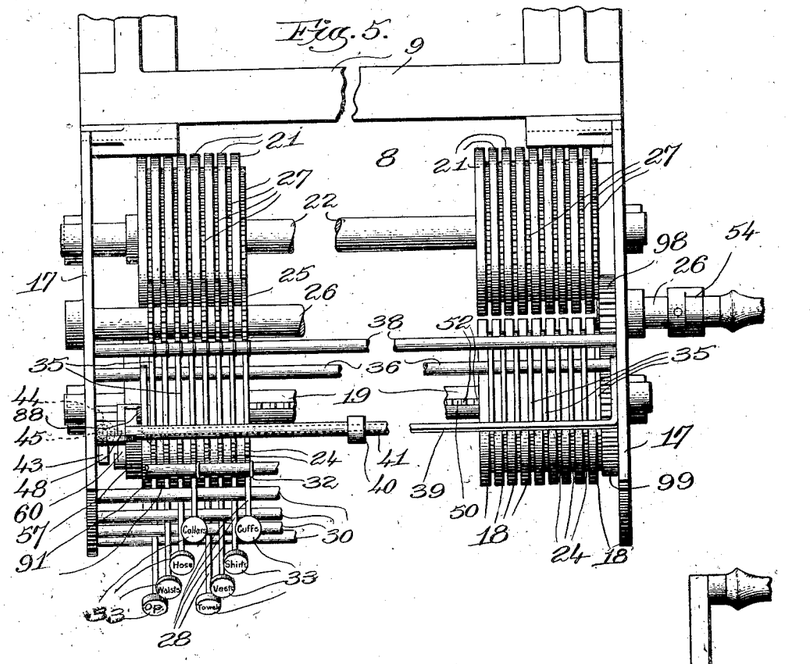
Fig. 5 is a top plan view of the printing head with the casing or cover removed and with parts broken out.
Figure 6:
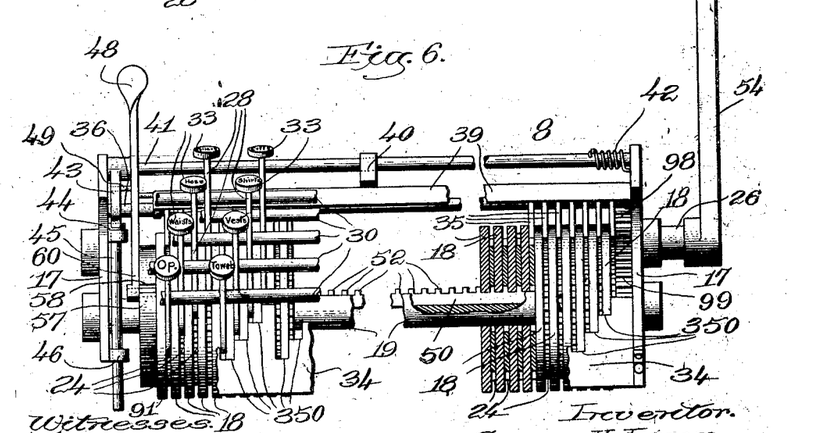
Fig. 6 is a front view of the parts shown in Fig. 5 with some parts broken away and shown in section.
Figure 13:
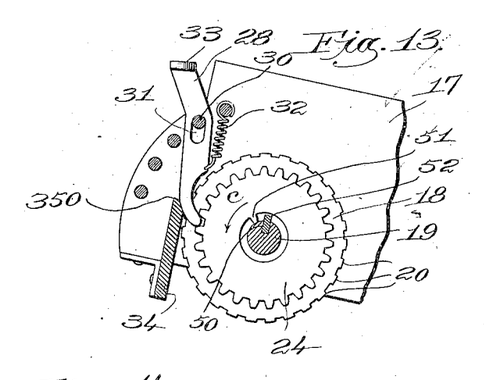
Fig. 13 is a detail showing the operation of the actuators or keys 28.
Figure 14:
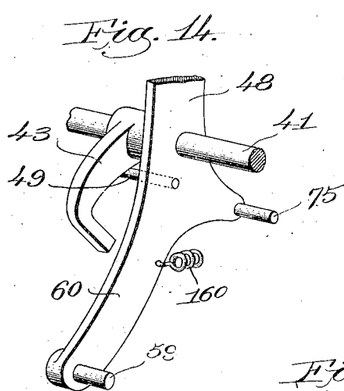
Fig. 14 is a fragmentary perspective view of the releasing mechanism for the lock.

Each quantity-indicating wheel and its corresponding price-indicating wheel are connected together so that they must always move in unison, so that when any quantity-indicating wheel is set to bring a character indicating any particular quantity into printing position, the corresponding price-indicating wheel will be set so as to bring into printing position the character 23 thereon indicating the price of this particular quantity. For thus connecting the corresponding quantity-indicating and price-indicating wheels, each quantity-indicating wheel has rigid therewith a gear wheel 24 which meshes with a pinion or intermediate gear 25 loose on a rod 26 that is supported by the side pieces 17 and that meshes with a gear 27 fast to the corresponding price-indicating wheel. Thus the price-indicating and quantity-indicating wheels of any pair are geared together so that they rotate in unison. There will preferably be as many quantity-indicating wheels 18 as there are articles on the laundry list and each wheel is constructed to be independently adjusted or set so as to bring any one of the characters 20 thereon into printing position. For thus setting each quantity-indicating wheel I have provided an actuator 28 which is adapted upon each actuation thereof to advance the quantity-indicating wheel one step so that in order to bring any quantity-indicating wheel into position to print any desired number, the actuator for said wheel will have to be actuated said number of times. If, for instance, it is desired to print the number 5, the actuator will have to be manipulated five times. There is a separate actuator 28 for each quantity-indicating wheel 18, and each actuator is provided with a nose 29 adapted to engage the teeth of the gear 24, and it is guided in its movement by a guide rod 30 which is supported by the side pieces 17 and extends through a slot 31 in the actuator. A spring 32 tends to return each actuator to its initial position and serves also to hold the nose 29 in engagement with the teeth of the gear. Each time that any key or actuator 28 is depressed the corresponding type wheel 18 will be advanced one step as will be obvious. Each key has a cap 33 on which may be printed or formed the name of the article to which the corresponding quantity-indicating member corresponds, as shown in Figs. 5 and 6. There is one such key or actuator for each of the type wheels 18, and as the type wheels are arranged closely together, I prefer to arrange the keys in staggered relation, as seen in Figs. 2, 5 and 6, so that the cap pieces 33 of the keys will not interfere with each other. In order to prevent the type wheels from overrunning if any key is depressed with considerable force, I have provided a stop bar 34 which extends from one side to the other of the printing head in front of the type and which is provided with notches 350 in which the various keys play. The bottoms of these notches are so positioned that when any key is depressed to its full extent, as shown in Fig. 13, the nose thereof will engage the bottom of the notch and will be held tightly in the recess between the two teeth of the gear and will thus prevent any overrunning thereof. Each type wheel 18 is yieldingly held in its adjusted position by a holding pawl 35 which is pivotally mounted on a rod 36 extending between the two side pieces 17 and is acted on by a suitable spring 37 which is connected to another rod 38 also extending between the side pieces. There is one of these holding pawls for each of the type wheels 18.

From the above it will be seen that in order to set the type wheels for printing any particular laundry list, the operator will depress each of the keys 28 that correspond to an article in the wash a number of times equal to the number of such articles, by which operation the correct quantity-indicating characters 20 on the quantity-indicating type wheels 18 are brought into proper position to print the number or quantity of each article in the wash. This setting of the quantity-indicating type wheels results in also setting the corresponding price-indicating wheels 21, so that when a printing impression is made the correct price list will be printed.

When the machine is properly set, the laundry list is placed on the platen and a suitable clutch will be thrown into operation by a treadle or otherwise to cause the crank disk 15 to rotate, said clutch preferably being of such a nature as to cause the crank disk to rotate once and then come to rest. The rotation of the crank disk will elevate the platen and bring the laundry list against the adjusted type wheels, thus causing the printing impression to be made, and will then lower the platen away from the type wheels.

Figure 3:
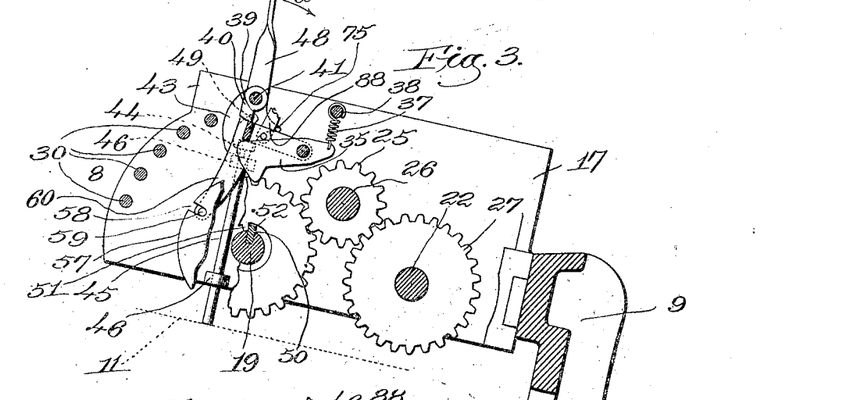
Fig. 3 is a similar view with some of the parts omitted to make the showing clearer.

In order to properly set the type wheels to print any particular laundry list, it is necessary that they should first be all restored to zero position because the setting operation in order to be accurate must always begin from the zero position. Therefore, after any laundry list has been printed it is necessary to restore all of the type wheels to zero position before attempting to reset the machine for printing a new list. For thus restoring the type wheels to zero position, I have provided herein the following mechanism: The shaft 19 is provided with a longitudinal groove in which is received a restoring member 50 that is provided with a plurality of fingers 52 that extend beyond the periphery of the shaft and between which the type wheels 18 are received. The gears 24, which are rigid with the type wheels 18, each have an aperture therethrough larger than sufficient to receive the shaft 19 and each is provided with a lug or tooth 51 which is adapted to be engaged by a finger 52 of the restoring member. When the parts are in their normal position and the type wheels 18 are in their zero position, the teeth 51 on the gears 24 are in engagement with and stand directly in front of the fingers 52 on the restoring member, as seen in Figs. 2 and 3. As any type wheel 18 is advanced in the direction of the arrow $b$, Fig. 2, and $c$ in Fig. 13, to bring any printing character thereon into printing position, the tooth 51 thereof will move away from the corresponding finger 52 on the restoring member, as seen in Fig. 13.

Figure 15:
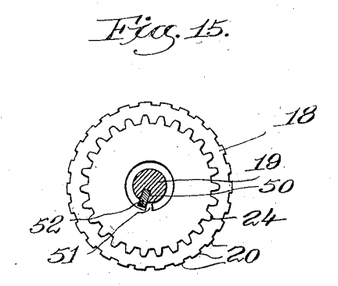
Fig. 15 is a detail showing the way of restoring the type wheels to zero position.
Figure 16:
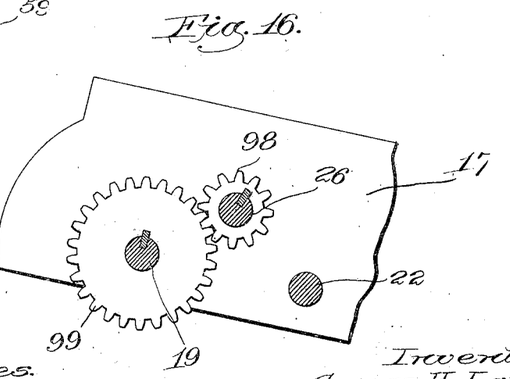
Fig. 16 is a section on the line x—x, Fig. 5.

To restore the type wheel to its initial or zero position the shaft 19 is given one complete revolution in the direction of the arrow $c$, Fig. 13, and in so doing it turns all the type wheels which have not been set or adjusted through one complete revolution, the type wheels which have been set being held at rest by the holding pawls 35 during this turning movement until the fingers 52 on the restoring member come into engagement with the teeth 51, as shown in Fig. 15, after which all of the type wheels will rotate in unison until the parts have been restored to their initial position. The restoring of the type wheels, therefore, simply involves turning the shaft 19 forwardly through one complete revolution. Since each price-indicating type wheel 21 is geared to its corresponding quantity-indicating type wheel, it will be obvious that the operation of restoring the quantity-indicating type wheels 18 to their initial position will result in also restoring the price-indicating type wheels to their zero position.

Any suitable devices may be employed to operate the shaft 19. As herein shown, the shaft 19 has fast thereon a gear 99 which meshes with a gear 98 fast on the shaft 26, and the latter is provided with a handle 54 by which it may be turned. I will preferably make the gears 98 and 99 two-to-one gears so that it will take two revolutions of the handle 54 to rotate the shaft 19 once. I prefer this construction for it reduces the liability of the operators throwing the type wheels 18 beyond the zero position when restoring them, owing to the fact that the shaft 19 turns only half as fast as the shaft 26.

As above stated it is necessary to restore all the type wheels to zero position before attempting to re-set the type wheels to print any desired laundry list, and to prevent the operator from actuating the setting mechanism before restoring the type wheels to zero position, I have provided means whereby the setting mechanism is rendered inoperative when the printing impression is made and is rendered operative again only after the restoring mechanism has been unlocked preparatory to restoring the type wheels to zero position. The setting mechanism may be rendered inoperative either by providing means for locking the keys 28, or means for locking the type wheels 18, or in any other appropriate way. In the present embodiment I have provided a device by which the type wheels 18 become locked from movement when the printing impression is made, and this is accomplished by providing a locking bail 39 which is pivoted on the rod 36 and overlies the holding pawls 35. This bail is normally free to be moved vertically so that as the type wheels 18 are turned the holding pawls can freely click over the teeth of the gears 24. Situated above the locking bail 39 is a dog 40 which is rigidly carried by a shaft 41 that is mounted to turn in the cheek-pieces and that is acted on by a spring 42 tending to turn it in a direction to throw the dog 40 over the locking bail 39. This rod 41 has rigid therewith an arm 43, the end of which is curved and normally rests against the head 44 of a plunger 45 that is freely movable in bearings 46 carried by one of the side pieces 17. When the plunger is in its lowered position, as shown in Fig. 2, the engagement of the arm 43 therewith will hold the dog 40 out of engagement with the bail 39, thus permitting the bail to move freely. The lower end of the plunger projects slightly below the printing head and is so positioned that it will be engaged by the platen when the latter is raised and just before the platen is brought into engagement with the type wheels. The engagement of the platen with the plunger elevates the latter, as shown in Fig. 3, until the head 44 passes off from the curved end of the arm 43 when the spring 42 will throw the arm and locking dog into the position shown in Fig. 3, thus carrying the locking dog over the top of the bail 39 and locking the latter from vertical movement. The bail in turn locks the holding pawls 35 and the latter lock the type wheels. It will thus be seen that whenever any printing impression is made the type wheels become locked automatically so that they cannot be re-set until they are unlocked.

Provision is made for normally locking the restoring mechanism and in the present embodiment of my invention I have provided means whereby the setting mechanism and the restoring mechanism may be simultaneously unlocked. The locking device for the restoring mechanism comprises a disk 57 which is fast on the shaft 19 and which is provided with a notch 58 that is adapted to receive a pin 59 on the end of an arm 60 that is loosely hung on the shaft 41 and is acted on by a spring 160 that tends normally to hold the pin 59 in the notch 58. So long as the pin occupies the notch, the shaft 19 will be locked from rotation and the restoring mechanism cannot be operated. To release the lock for the restoring mechanism, I have provided the arm 60 with a handle 48 so that when the handle is moved in the direction of the arrow a, Fig. 3, the pin 59 will be withdrawn from the notch 58, thus permitting the restoring mechanism to be operated. In the present embodiment I have also provided means whereby this unlocking of the restoring mechanism effects the unlocking of the setting mechanism or the type wheels, and I accomplish this by providing the arm 60 with a pin or projection 49 that is adapted to engage the arm 43 that is fast on the rod 41 so that whenever the handle 48 is moved in the direction of the arrow a Fig. 3, the shaft 41 will be rocked thereby carrying the locking dog 40 out of engagement with the bail 39. This same movement operates also to withdraw the arm 43 from underneath the head 44, thus permitting the plunger 45 to drop into its normal position, as shown in Fig. 2, in which position it engages the arm 43 and holds the locking dog 40 in its inoperative position. This movement of the handle 48, therefore, operates both to unlock the restoring mechanism and to unlock the setting mechanism so that as soon as the type wheels are restored to their zero position the setting mechanism will be free to be operated to re-set the type wheels for the next laundry list.

The type wheels may be inked in any suitable way and I have herein provided two inking rolls 60 and 61, one for each set of type wheels, which rolls are carried by swinging arms 62, 63 pivotally mounted to the side pieces 17 and connected by links 64. The arms 63 are connected by a yoke arrangement 65 with a post 66 rising from the arm 12 so that as the arm rocks the inking rolls will be swung into position to ink the type and then will be retracted out of the way of the platen.

In a machine of this type it is desirable that the type should be freshly inked just before each impression is made, and to accomplish this I arrange the inking mechanism so that the inking pads are brought into contact with those printing characters that are in printing position at the time that the platen is in its lowest position. I also preferably arrange the driving clutch so that the clutch will be disengaged when the parts are in substantially the position shown in Fig. 1, that is, just before the crank pin of the crank disk reaches the upper dead-center point. The arrow c indicates the direction of rotation of the crank disk. When the machine is started the first movement of the crank disk carries the crank pin up past the dead-center point, during which time the platen will be lowered slightly and the inking rolls will be brought into contact with the printing characters, and during further movement of the crank disk the platen will be elevated into contact with the freshly-inked type wheels and the inking pads will be carried back out of the way of the platen. With this arrangement it is possible to have a freshly-inked type for each printing operation no matter how long the machine has been idle since the last printing operation.

On the laundry list as printed there are usually some prices that are not fixed, but that vary according to the character of the particular article. For instance, on the laundry list shown in Fig. 12, the price of ladies' dresses would be anywhere from 50¢ to $3.50, and on white waists anywhere from 30¢ up. Where the prices vary thus according to the character of the article, it will, of course, be impossible to use printing characters on the price-indicating members 21 such as to indicate fixed prices. Accordingly on those price-indicating members 21 which correspond to the articles where the price is variable, I propose to use a dash, such as shown at 70 in Fig. 11, or some other character which will call attention to the fact that a blank space has been left at this point which must be filled in separately in order to complete the price list.

Figures 7, 8, 9, 10, 11:
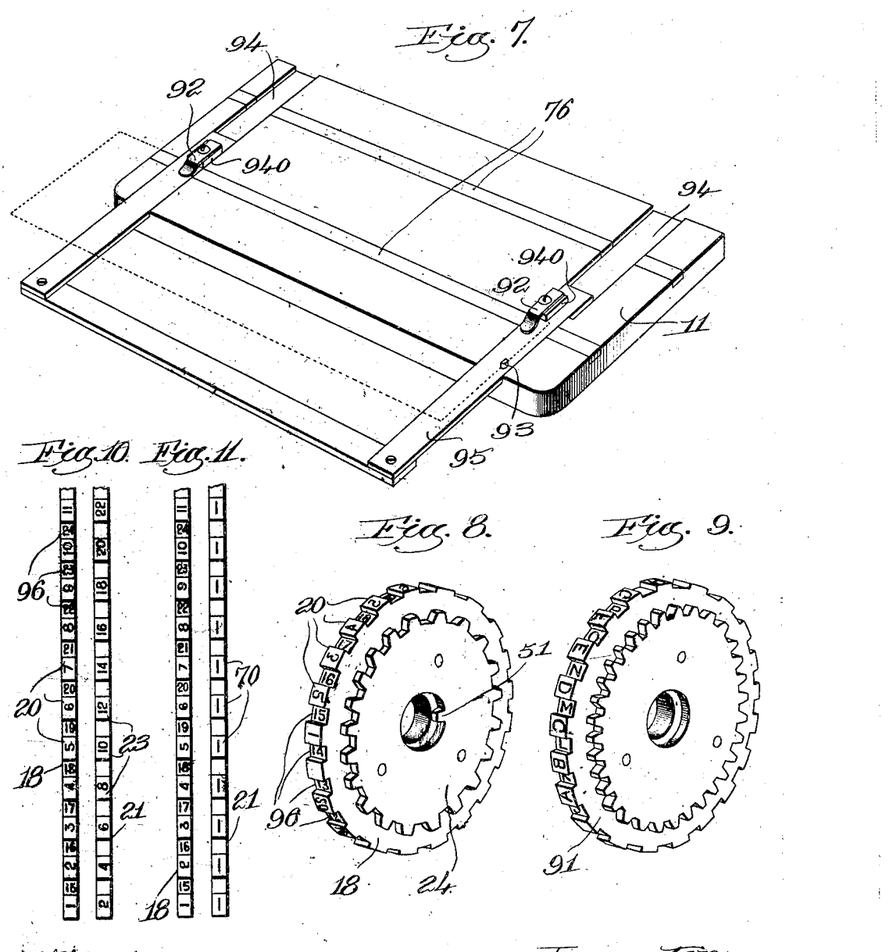
Fig. 7 is a detail perspective view of the platen or holder for the laundry list to be printed.
Fig. 8 is a perspective view of one of the printing wheels for printing the number of articles.
Fig. 9 is a perspective view of the printing wheel by which any particular operator is identified.
Fig. 10 shows a portion of one of the number-indicating printing wheels, and a corresponding portion of one of the price-indicating printing wheels, developed.
Fig. 11 is a similar view showing parts of another set of number-indicating and price-indicating wheels.

The laundry list to be printed is placed on the platen with the edge 97 thereof parallel with the front edge of the platen and in order that the characters may be properly printed on the list, I have cut or formed the type on the wheels so that they are arranged horizontally instead of vertically, as seen in Figs. 8, 10 and 11. When formed in this way the impression which they make on the list will be vertical relative to the list because of the position which the list occupies while being printed.

In order to assist the operator in setting any number-indicating wheel type wheel I will preferably provide each of said wheels with indicating numbers 96 which are placed between the printing characters or type 20, as plainly seen in Figs. 8 and 10. These indicating numbers are duplicates of the printing characters 20 and are so arranged on the wheels that when any indicating character or number is visible on the front of any wheel the duplicate printing character or number is in position to make an impression. The indicating characters 96 are placed vertically on the type wheels so that they can be more readily read.

I have herein shown the platen 11 as provided with a slide or carriage 95 which is adapted to receive the laundry list and which may be moved to carry said list into or out from position to be printed. This slide operates in ways 94 formed in the platen and by which it is guided, and it is provided with gages 93, 940 to properly position the list thereon, as seen in Fig. 7, wherein the list is shown in dotted lines. I may also employ resilient holders 92 under which the edge of the list may be slipped, and which assist in holding it in place while the impression is made thereon. This slide or carriage facilitates the placing of the laundry lists correctly in position to be printed.

The machine herein shown also embodies an additional type wheel which is provided with operator-identifying characters so that a character may be printed on each laundry list by which the operator who printed the list may be identified. This additional type wheel is shown at 91 and it is mounted on the shaft 19 and is set by an actuator or key 28 in the same manner as the type wheels 18 are set. Any suitable identifying characters may be employed, and those herein shown are the letters of the alphabet. Each operator will have some particular letter, and before he begins to use the machine he will set the type wheel 91 so that it will print on the list his particular identifying character. This type wheel 91 is not provided with a tooth 51 and therefore it will not be affected by the restoring mechanism, but will remain in any adjusted position until it is reset by another operator.

Figure 4:
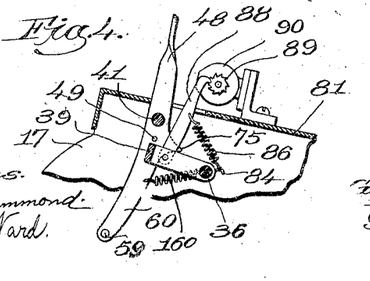
Fig. 4 is a fragmentary sectional view showing a counter attachment applied to my machine.

It is sometimes desirable to know the total number of pieces, or the total number of pieces of any particular kind, that are to be laundried each day or during any other interval of time, and to provide for determining this I have devised a counter attachment which I will now describe. In Fig. 4 I have shown this counter at 90 and it is provided with a ratchet wheel 89 which is adapted to be actuated by a pawl 88. If the counter is to register the total number of pieces of all kinds, then said pawl 88 may be actuated by some part of the device which is moved each time that any one of the quantity-indicating wheels are advanced one step, while if the counter is simply to indicate the total number of some particular article then said pawl would be actuated by the movement of one particular type wheel 18. I have herein shown the pawl as connected to the bail 39, which, it will be noted, rests on the holding pawls 35. Each time that any key is depressed to advance a type wheel one step, the corresponding holding pawl will be raised as one of the teeth of the gear 24 passes under it, and such movement will be communicated to the bail 39, as will be obvious. Hence the bail will have a movement each time that any key 28 is depressed. During the upward movement of the bail the pawl 88 will click over one tooth of the ratchet 89 and when the tooth of the gear 24 has passed from under the holding pawl 35, the downward movement of the bail and pawl 88 will turn the counter one step.

A spring 86 is shown connected at one end to the pawl 88 and at the other end to an arm 84 extending from the bail 39, said spring operating to hold the pawl in engagement with the ratchet and also to assist in giving to the bail and pawl their operative downward movement to advance the counter.

Since the bail 39 is given a vibratory movement during the time that the type wheels are restored to their initial position, as well as when the type wheels are being advanced, I have provided for throwing the counter out of operation during such restoration of the type wheels, and I accomplish this herein by providing means whereby when the releasing lever 48 is moved in the direction of the arrow a, Fig. 3, the pawl 88 will be thrown out of engagement with the ratchet 89. To accomplish this the releasing lever 48 is provided with a pin 75 adapted to engage the back side of the pawl 88 so that when the lever is thrown into a position to disengage the pin 59 from the slot 58, the pawl 88 will be disengaged from the ratchet 89.

The operation of the device will be clearly understood from the foregoing, but may be briefly summed up as follows: When any operator begins to use the machine, he will first depress the proper actuator or key 28 so as to bring his particular identifying character on the type wheel 91 into printing position. The identifying character on the list shown in Fig. 12 is the letter "B." The operator is then ready to set the machine for printing the first laundry list, and if the bundle for this list comprises two shirts, six hose, three white waists, and four towels, he will depress the "shirt" key twice so as to set the corresponding quantity-indicating type wheel 18 to print the character "2" and the corresponding price-indicating wheel so as to print "30." He will then depress the "hose" key 28 six times so as to set the corresponding quantity-indicating wheel 18 in position to print "6" and the corresponding price-indicating wheel 21 in position to print "18." He will then depress the "white waists" key three times so as to set the corresponding quantity-indicating wheel to print "3" and will depress the "towels" key four times so as to set the corresponding quantity-indicating and price-indicating type wheels in position to print "4" and "12," respectively. The laundry list is then placed on the carrier 95 and the latter is pushed into position on the platen 11 and the machine is started so as to bring the platen against the type wheels with the result that the laundry list will be printed as indicated in Fig. 12. When this laundry list has been printed the type wheels must be restored to their initial position which is done by first moving the releasing lever 48 backwardly in the direction of the arrow $a$, Fig. 3, and then turning the handle 54 twice in the direction of the arrow $b$, Fig. 1. When the parts have been restored to their initial position, the handle 54 is turned back into the position shown in Fig. 1 and the machine is ready to be set to print the next laundry list.

81 designates a cover which may be applied and secured to the side pieces 17 for covering and protecting the printing mechanism.

While I have illustrated one embodiment of my invention, I wish it distinctly understood that the invention is not limited to printing laundry lists but with suitable modifications as to the character of the type may be used for printing a variety of related data about different articles.

While I have herein illustrated the mechanism as arranged so that the quantity-indicating type wheels are at the front of the head and the price-indicating type wheels at the rear, yet it will be obvious that the position of these wheels may be varied without in any way departing from the invention.

Having fully described my invention, what I claim as new and desire to secure by Letters Patent is:—

1. In a printing machine, the combination with a plurality of independently-settable quantity-indicating printing members, each having a plurality of printing characters to designate different quantities, of a corresponding number of price-indicating printing members situated in line with the quantity-indicating printing members, gearing to connect each price-indicating printing member to its quantity-indicating printing member whereby said members move in unison, each price-indicating member having the same number of printing characters thereon as are on the corresponding quantity-indicating printing member and each of said printing characters indicating the proper price for the number indicated by the corresponding quantity-indicating printing character on the corresponding quantity-indicating printing member, and means to move any price-indicating printing member and its corresponding quantity-indicating printing member simultaneously so as to bring into printing position in the same line and at the same time any quantity-indicating printing character and the corresponding price-indicating printing character.

2. In a printing machine, the combination with a plurality of independently-settable quantity-indicating printing members, each having a plurality of printing characters thereon to designate different quantities, of means to move each printing character to bring any printing character thereon into printing position, means to cause an impression to be made of the characters that are in printing position, and means controlled by each printing member to cause an impression to be made of the price corresponding to the printing character thereon which is in operative position simultaneously with the making of the impression by said character and in the same line as said impression.

3. In a printing machine, the combination with a plurality of movable quantity-indicating printing members having printing characters thereon to indicate quantity, of a corresponding number of movable price-indicating printing members situated in line with the quantity-indicating members and having printing characters thereon to indicate price, means to set each quantity-indicating printing member to bring any printing character thereon into printing position, means connecting each price-indicating printing member to the quantity-indicating printing member which is in line therewith so that when any quantity-indicating printing member is set to bring any quantity-indicating printing character thereon into operative or printing position the corresponding price-indicating printing member will be set so as to bring the corresponding price-indicating printing character into printing position in line with the operative quantity-indicating printing character, a platen, means to move the printing head and platen relative to each other to cause an impression to be made, and means to lock the printing members from movement in either direction while the impression is being made.

4. In a printing machine, the combination with a plurality of movable quantity-indicating printing members having printing characters thereon to indicate quantity, of a corresponding number of movable price-indicating printing members, situated in line with the quantity-indicating printing members and each having printing characters thereon to indicate the proper prices for the quantities represented by the printing characters of the corresponding quantity-indicating printing member, means to set each quantity-indicating printing member to bring any printing character thereon into printing position, means connecting each price-indicating printing member to its quantity-indicating printing member so that when any quantity-indicating printing member is set to bring any character thereon into printing position the corresponding price-indicating printing member will be set so as to bring the corresponding price-indicating character into printing position, a platen, means to move the printing head and platen relative to each other to cause an impression to be made, and means controlled by the platen to lock the printing members from movement while the impression is being made.

5. In a printing machine, the combination with a printing head having a plurality of independently-settable type wheels, of a platen, means to move the printing head and platen relative to each other to cause an impression to be made, normally inoperative locking means for the printing wheels and platen-controlled means to render said locking means operative while the impression is being made.

6. In a printing machine, the combination with a printing head having a plurality of independently-settable type wheels, of a platen, means to move the printing head and platen relative to each other to cause an impression to be made, locking means to hold the printing wheels from turning while an impression is being made, and means situated to be engaged by the platen as the latter and the printing head move toward each other to render said locking means operative.

7. In a printing machine, the combination with a printing head having a plurality of independently-settable type wheels, of a holding pawl for each type wheel, a locking member engaging all of said pawls, a dog for holding said locking member in locking engagement with the pawls, a spring tending to throw the dog into operative position, means for normally holding said dog in inoperative position, and means actuated by the platen for releasing the dog thereby permitting it to swing into locking position.

8. In a printing machine, the combination with a printing head having a plurality of independently-settable type wheels, of a holding pawl for each type wheel, a locking member engaging all of said pawls, a dog for holding said locking member in locking engagement with the pawls, a spring tending to throw the dog into operative position, means for normally holding said dog in inoperative position, and means to release the dog when the platen and printing head are approaching each other.

9. In a printing machine, the combination with a printing head having a plurality of independently-settable printing members, a holding pawl for each printing member, means common to all the pawls and adapted to engage them all when the impression is made and hold them in locking engagement with the printing member thereby to lock all said printing members from movement.

10. In a printing machine, the combination with a printing head having a plurality of rotatable printing members, each having a toothed portion, of a holding pawl engaging the toothed portion of each printing member with sufficient friction to hold said printing member normally stationary while permitting it to be rotated, means to engage all the pawls when an impression is made thereby to lock them against the toothed portions of the printing members and prevent the latter from movement.

11. In a printing machine, the combination with a printing head having a plurality of independently-settable printing members, of a holding pawl for each printing member, a locking member to engage all the pawls, and means to engage the locking member and lock the latter against the pawls when an impression is made whereby all the printing members are locked from movement.

12. In a printing machine, the combination with a printing head having a plurality of independently-settable printing members, of a holding pawl for each printing member, a locking member to engage all the pawls, and a dog to engage the locking member and lock the latter against the pawls when an impression is made whereby all the printing members are locked from movement.

13. In a printing machine, the combination with a shaft, of a plurality of independently-settable type wheels loosely mounted thereon and each capable of making repeated rotations in the same direction and each having a lug, means to turn each type wheel forwardly to bring any printing character thereon into printing position, projections extending from said shaft and situated immediately in the rear of said lugs when the type wheels are in their zero position, and means to give the shaft a complete rotation in the same direction in which the type wheels are rotated when they are set thereby to rotate all the type wheels forwardly to bring them to zero position.

14. In a printing machine, the combination with a shaft, of a plurality of independently-settable type wheels loosely mounted thereon and each having a lug, means to turn each type wheel forwardly to bring any printing character thereon into printing position, projections extending from said shaft and situated immediately in the rear of said lugs when the type wheels are in their zero position, means to give the shaft a complete rotation in the same direction in which the type wheels are rotated when they are set thereby to rotate all the type wheels forwardly to bring them to zero position, and means independent from the type wheels to lock the shaft from further rotation upon completion of one revolution thereof.

15. In a printing machine, the combination with a plurality of independently-settable type wheels, of means for locking said type wheels from movement while the impression is being made, a single restoring member for restoring all the type wheels simultaneously to zero position, and means associated with the type wheel locking device to lock the restoring member from movement while the type wheels are locked.

16. In a printing machine, the combination with a plurality of independently-settable type wheels, of means for locking said type wheels from movement while the impression is being made, a restoring member for restoring all the type wheels simultaneously to zero position, a lock for the restoring member, and a releasing lever to release simultaneously the type wheel locking mechanism and the lock for the restoring member.

17. In a printing machine, the combination with a printing head having a plurality of independently-settable type wheels, each having a toothed member associated therewith, of a slotted setting key for each type wheel, each key having a nose to engage a toothed member, and rods extending through the slots of the keys and by which they are guided whereby when each key is depressed the corresponding type wheel is moved forward one step, and means to prevent over-running of the type wheels.

18. In a printing machine the combination with a printing head having a plurality of independently-settable type wheels, each having a toothed member associated therewith, of a one-piece setting key for each type wheel, each key having a head at one end and a nose at the other end to engage the toothed member, means to support the keys for sliding movement whereby when each key is depressed the corresponding type wheel is moved forward one step, and a stop bar so situated that when any key is depressed the nose thereof passes between said bar and the corresponding toothed member whereby the bar presses any depressed key toward its toothed member thereby to prevent overrunning of the latter.

19. In a printing machine, the combination with a printing head having a plurality of independently-settable type wheels each having a toothed member associated therewith, of a setting key for each type wheel, each key having integral therewith a head by which it is depressed and a nose to engage the toothed member, means to support and guide the keys whereby when each key is depressed the corresponding type wheel is moved forward one step, and means coöperating with the keys to prevent over-running of the type wheels.

20. In a printing machine, the combination with a printing head having a rotatable type wheel, of a toothed member associated therewith, a slotted setting key for said type wheel having a tangential relation to the toothed member and provided with a nose to engage said member and a head by which it is depressed, a rod extending through said slot and by which the key is guided, and a stop member situated to be engaged by the back side of the nose when the key is depressed thereby to press the nose toward the toothed member and thus prevent the type wheel from over-running.

21. In a printing machine, the combination with a printing head having a plurality of independently-settable type wheels, each having a toothed member associated therewith, of a setting key for each type wheel having a tangential relation thereto and provided with a nose to engage the toothed member and a head by which it is depressed, means to support the keys for movement tangentially of the toothed member, and a stop bar to engage the back side of the nose of each key when it is depressed and press said nose toward the toothed member thereby to prevent over-running of the latter said stop bar having means to guide the lower ends of the keys.

22. In a printing machine, the combination with a plurality of printing members, of setting mechanism to set said members to bring the desired characters thereon into printing position, means to restore all the printing members to zero position, and means to prevent the further operation of the setting mechanism after an impression has been made and before the setting mechanism is operated until said printing members have been restored.

23. In a printing machine, the combination with a plurality of printing members, of setting mechanism to set said members to bring different characters into printing position, means to cause the printing members to make a printing impression, means to restore all the printing members to zero position, and means rendered operative when the printing impression is made to prevent the setting mechanism from operating until the printing members have been restored.

24. In a printing machine, the combination with a plurality of printing members, of setting mechanism to set the printing members to bring different printing characters into printing position, a single restoring mechanism to restore positively all the printing members to zero position, a lock for the restoring mechanism, a lock for the setting mechanism, and means to release said locks simultaneously.

25. In a printing machine, the combination with a plurality of printing members, of setting mechanism to set said members to bring different characters into position for printing, means to cause a printing impression to be made, means to lock the setting mechanism from operation when a printing impression is being made, restoring mechanism to restore all the printing members to zero position, a lock therefor, and means to release the setting mechanism by the release of the lock for the restoring mechanism.

26. In a printing machine, the combination with a plurality of independently-settable type wheels, each having a toothed member associated therewith, of a setting key for each type wheel, each key having a nose to engage the toothed member, means to support and guide the keys whereby when each key is depressed the corresponding type wheel is moved forward one step, and a stop bar situated that when any key is depressed the nose thereof passes between said bar and the corresponding toothed member, said bar operating to prevent disengagement of the nose of any key from its toothed member after the key is partially depressed.

27. In a printing machine, the combination with a plurality of printing members of setting mechanism to set said members to bring the desired members thereon into printing position, means to restore all the printing members to zero position, a lock for the restoring means, and means to prevent the further operation of the setting mechanism after the impression has been made until said restoring means is unlocked.

28. In a printing machine, the combination with a plurality of printing members, of setting mechanism to set said members to bring different characters into printing position, means to cause the printing members to make a printed impression, means to restore all the printing members to zero position, a lock for the restoring means, and means rendered operative when the printed impression is being made to prevent the setting mechanism from operation until the restoring means has been unlocked.

29. In a printing machine, the combination with a printing head having a plurality of independently-settable type wheels, each having a toothed member associated therewith, of a slotted setting key for each type wheel, each key having integral therewith a head by which it is depressed and a nose to engage the toothed member, guiding rods extending through the slots of the keys, and a slotted stop bar in the slots of which the ends of the keys are received and by which they are guided.

30. In a printing machine, the combination with a printing head having a plurality of independently-settable type wheels each having a toothed member associated therewith, of a one-piece setting key for each type wheel, each key having at its upper end a head by which it is depressed and at its lower end a nose to engage the toothed member, and a stop bar to engage the back side of the nose of each key when it is depressed, thereby to press its nose toward and against the toothed member.

In testimony whereof, I have signed my name to this specification, in the presence of two subscribing witnesses.

GEORGE H. LANG.

Witnesses:
LOUIS C. SMITH,
THOMAS J. DRUMMOND.